United States Patent [19]

Yamanaka et al.

[11] Patent Number: 4,680,960

[45] Date of Patent: Jul. 21, 1987

[54] MICROWAVE AND LUMINOUS PROBE

[76] Inventors: Teruo Yamanaka, 1756-2, Aza Hosoguchishita, Oaza Hirabari, Tempaku-cho, Tempaku-ku, Nagoya-shi, Aichi-ken; Takao Sugimoto, 4-148, Takabata, Nakagawa-ku, Nagoya-shi, Aichi-ken; Kizo Hayakawa, 41-2, Higashiyashiki, Takayokosukamachi, Tokai-shi, Aichi-ken, all of Japan

[21] Appl. No.: 765,541

[22] Filed: Aug. 14, 1985

[30] Foreign Application Priority Data

Aug. 20, 1984 [JP] Japan ................................ 59-173072

[51] Int. Cl.⁴ ............................................ G01M 15/00
[52] U.S. Cl. ................................................. 73/117.3
[58] Field of Search ................... 73/117.3, 119 A, 116, 73/35; 333/124, 32, 35

[56] References Cited

U.S. PATENT DOCUMENTS

| | | | |
|---|---|---|---|
| 3,681,714 | 8/1972 | Terakawa | 333/124 |
| 4,337,648 | 7/1982 | Gillespie | 73/117.3 |
| 4,384,480 | 5/1983 | Krage et al. | 73/117.3 |
| 4,493,208 | 1/1985 | Grover | 73/117.3 |
| 4,545,238 | 10/1985 | Kinoshita et al. | 73/117.3 |

OTHER PUBLICATIONS

Moreno, "Microwave Transmission Design Data", 1948, Sperry Gyroscope Co., Dover Pub., N.Y., N.Y.

Primary Examiner—Stewart J. Levy
Assistant Examiner—Robert R. Raevis
Attorney, Agent, or Firm—Parkhurst & Oliff

[57] ABSTRACT

A microwave and luminous probe which employs a coaxial cable in place of a waveguide. The coaxial cable includes a transparent insulator interposed between an inner conductor and an outer conductor. Accordingly, a microwave is propagated between the inner and outer conductors, while light is transmitted by the transparent insulator.

20 Claims, 5 Drawing Figures

MICROWAVE AND LUMINOUS PROBE

BACKGROUND OF THE INVENTION

1. Field of the Invention

The present invention relates to a microwave and luminous probe which detects the piston position in a combustion chamber of an internal combustion engine by employing a microwave and the light emitted by combustion in the combustion chamber by means of a photosensor.

2. Description of the Prior Art

In a conventional microwave and luminous probe of the above-described type, light is linearly propagated through a transmission line to a detector portion, while the course of the microwave is changed by 90°, whereby both of them are separated from each other. Since it is necessary to change the course of the microwave by 90° as described above, a structure comprising two waveguide to coaxial adaptors (including end portions of coaxial lines) and a waveguide therebetween has beed used. This structure serves to transmit the microwaves between two different coaxial lines. Since the structure has a cross-sectional width larger than a half of the wavelength of the microwave within the waveguide, it disadvantageously involves an increase in size of the probe and consequently inconvenient handling. Further, it is necessary to give special consideration to the designing of the probe so that it does not interfere with other components of the engine.

Furthermore, the converting portion can transmit microwaves within only a relatively narrow frequency band. On the other hand, the shape of combustion chambers of internal combustion engines differs for each type of engine, and it is necessary to change the wavelength of the microwave used in accordance with the shape of the combustion chamber employed. Accordingly, it is disadvantageously necessary to change the dimensions of the converting portion in accordance with the type of engine.

SUMMARY OF THE INVENTION

Thus it is a primary object of the present invention to provide a microwave and luminous probe which eliminates the above-described disadvantages of the prior art.

To this end, the invention provides a microwave and luminous probe which comprises: a coaxial portion having one end thereof inserted into a combustion chamber; a dipole antenna constituted by that portion of the coaxial portion which projects into the combustion chamber; a see-through hole having a photosensor mounted at one end thereof, for guiding the light led from the coaxial portion; a coaxial impedance transformer connected to the coaxial portion, for obtaining matching in impedance; a coaxial microwave connector fitted into a bore which communicates with the side wall of the see-through hole; and a bent coaxial portion connected to the coaxial microwave connector and to the coaxial impedance transformer, wherein the first-described coaxial portion, the coaxial impedance transformer and the see-through hole are disposed coaxially with each other, and the coaxial portion includes a straight tubular outer conductor, an inner conductor coaxially inserted into the outer conductor, and a transparent insulator interposed between the outer and inner conductors.

The end portion of the microwave and luminous probe on the side of the dipole antenna is inserted and secured into a mounting bore of an engine block extended into the combustion chamber. Thereupon, the light emitted by combustion in the combustion chamber is transmitted through the transparent insulator of the coaxial portion and passed through the space defined between the external and internal conductors of the coaxial impedance transformer as well as the see-through hole before being received by the photosensor. The photosensor converts this incident light into an electrical signal. Thus, it is possible to check the combustion condition in the combustion chamber.

On the other hand, the microwave which is transmitted from a microwave oscillator to the coaxial microwave connector through a coaxial cable is further transmitted to the bent coaxial portion, the coaxial impedance transformer and the coaxial portion which is constituted by the inner and outer conductors, and is then radiated from the dipole antenna. The radiated microwave is absorbed (when a resonance occurs) or reflected by the wall of the combustion chamber in the engine, and the reflected microwave is received by the dipole antenna and is transmitted in the opposite direction to the above. The received microwave is then separated by a transmit-receive separator and converted into a low frequency electrical signal by a microwave detector. Thus, it is possible to measure the piston position in the engine from the signal of the received microwave.

According to the present invention, the transmission and reception of the microwave to and from the probe is effected through the bent coaxial portion. Therefore, it is possible to reduce the size of the probe as compared with the conventional probe as discussed above. Further, since the bent coaxial portion has little frequency characteristic, it is advantageously possible to widen the frequency band of the probe. Moreover, the microwave and luminous probe of the invention has the coaxial impedance transformer. Therefore, it is possible to reduce the inner diameter of the outer conductor of the coaxial portion and to prevent the occurrence of loss of the reflected microwave and the deformation of resonance waveform which would otherwise be caused by impedance mismatching. Further, since no inner conductor exists at the side of the see-through hole which is closer to the photosensor, the microwave is prevented from propagating toward the photosensor. Furthermore, since the transparent insulator is interposed between the inner and outer conductors, the inner conductor is conveniently supported by the insulator, and light is transmitted by the same. In addition, the existence of the transparent insulator advantageously makes it difficult for the combustion gas, carbon and so forth in the combustion chamber to enter the inside of the microwave and luminous probe.

The transparent insulator is preferably made of a material which involves low loss in microwave frequency and has heat resistance. For example, fused quartz may be employed as the transparent insulator.

The sealing between the inner conductor and the transparent insulator and that between the outer conductor and the transparent insulator in the coaxial portion are preferably effected at the end portion of the coaxial portion on the side thereof which is closer to.the coaxial impedance transformer. By so doing, since the temperature at that end portion is relatively low, it is possible to employ an epoxy adhesive, which has excellent sealing and adhesive properties.

The above-described sealing is carried out by, for example, forming a bonding portion on the coaxial portion at which the outer diameter of the inner conductor is reduced and the inner diameter of the outer conductor is increased, and filling the gap defined therebetween with an epoxy adhesive. In this case, the length of the bonding portion is set at a half of the wavelength of the microwave passing therethrough, whereby it is possible to prevent any undesirable reflection at the bonding portion due to impedance mismatching.

The end portion of the coaxial portion on the side thereof which is closer to the combustion chamber is formed into a tapered shape by chamfering the distal end portion of the transparent insulator, and the outer conductor is covered with a cylindrical cap corresponding to the tapered shape, whereby it is possible to prevent any fragment of the broken transparent insulator from dropping into the combustion chamber if the insulator should be damaged or broken, which would otherwise damage engine components such as an intake-exhaust valve.

In the case of a high-load engine, the end portion of the coaxial portion on the side thereof which is closer to the combustion chamber is covered with a cap with a U-shaped vertical cross-section which has a bore formed in its bottom surface, the bore having a diameter which is larger than the inner diameter of the transparent insulator but smaller than the outer diameter of the same. Thus, it is possible to protect the transparent insulator from any thermal or mechanical damage.

The dipole antenna is constituted by a portion of the inner conductor of the coaxial portion which projects beyond the outer conductor by the length corresponding to $\frac{1}{8}$ to $\frac{3}{8}$ of the wavelength of the microwave used, thereby allowing the structure of the probe to be simplified.

The length of the coaxial impedance transformer is set at $\frac{1}{4}$ of the wavelength of the microwave passing therethrough, whereby it is possible for the probe to be reduced in size as well as simplified in structure.

The inner diameter of the see-through hole is made smaller than a diameter which is determined from the cut-off frequency of the hole which serves as a circular waveguide, whereby it is possible to prevent the microwave from propagating toward the photosensor. In addition, structuring allowance is provided which facilitates assembling of the bent coaxial portion. In this case, a tapered portion is interposed between the see-through hole and the coaxial impedance transformer. That portion is tapered with the ratio of the outer diameter of the internal conductor to the inner diameter of the external conductor being constant, whereby the characteristic impedance is maintained at a constant value.

The coaxial portion is fitted into a casing, while the photosensor, the see-through hole, the coaxial impedance transformer and a connecting portion are provided on a holder, and the holder is detachably fitted on the casing. By virtue of this structure, it is possible for the microwave and luminous probe to be easily mounted on and removed from the engine. Moreover, it is possible to easily remove the carbon adhering to the transparent insulator.

Further, the structure can be simplified by using the holder as the external conductor of the coaxial impedance transformer.

Thus, the microwave and luminous probe of the invention has its microwave transmission line constituted by the coaxial line alone. It is therefore possible to reduce the size of the probe and enable convenient handling. In addition, it is possible to lessen the possibility of the probe interfering with other engine components. Further, since the bent coaxial portion is constituted by a coaxial line which has little frequency characteristic, the frequency band of the probe is favorably widened, so that it is possible to employ a microwave and luminous probe of a particular shape for each of the various types of engine, thus reducing production costs.

Furthermore, since the probe is provided with the coaxial impedance transformer, it is possible to reduce the outer diameter of the coaxial portion and hence fit the probe into a mounting spot with a relatively small diameter which is formed such as to extend into the combustion chamber. Accordingly, it is advantageously possible for the microwave and luminous probe to check the light emitted by combustion without adversely affecting the combustion condition in the combustion chamber.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

A first embodiment of the present invention will be described hereinunder with reference to FIGS. 1 to 3.

Figure 1:
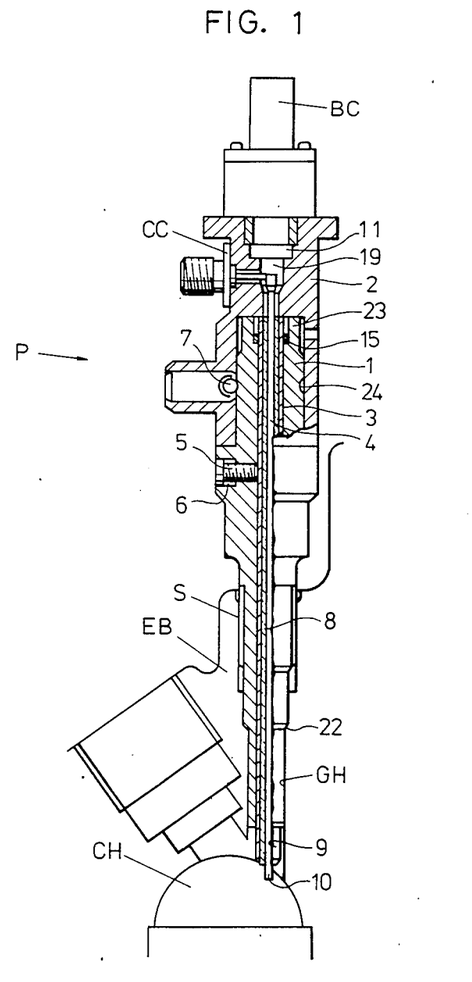
FIG. 1 is a partly-sectioned front elevational view of a microwave and luminous probe according to a first embodiment of the present invention in a state wherein the probe is mounted on an engine.

Referring first to FIG. 1, a microwave and luminous probe P is fitted into a glow plug hole GH formed in an engine block EB of a diesel engine and is adapted to detect the piston position in a combustion chamber CH and the light emitted by combustion therein. The microwave and luminous probe P has a connector BC secured to its upper end for connecting a shielded line (not shown) which transmits optical information which has been converted into an electrical signal by a photodiode 11. Further, one side portion at the upper end of the microwave and luminous probe P is designed to allow a connector CC to be secured thereto. The connector CC is used to connect a coaxial cable (not shown) which transmits a microwave for detecting the piston position.

The microwave and luminous probe P includes a casing 1 which has its lower portion inserted into the glow plug hole GH, and a holder 2 which also serves as an external conductor, is detachably fitted on the upper portion of the casing 1. Moreover, an annular passage (i.e. coaxial) portion 9 is fitted into the central axis portion of the holder 2. The coaxial portion 9 includes a tubular outer conductor 3, a straight inner conductor 4 which is coaxially inserted into the outer conductor 3, and a transparent insulator (dielectric) 8 interposed between the outer and inner conductors 3 and 4. Thus, the coaxial portion 9 is designed to transmit both a microwave and light. The lower end portion of the inner conductor 4 projects beyond the outer conductor 3 to constitute a dipole antenna 10 through which a microwave is transmitted and received.

In the embodiment shown, the outer diameter of the inner conductor 4 is set at 1.1 mm, while the outer diameter of the outer conductor 3 is set at 4.3 mm from the viewpoint of mechanical strength and workability, and the inner diameter of the outer conductor 3 is, therefore, set at 2.5 mm. On the other hand, the insulator 8 is required to support the inner conductor 4, transmit the light emitted in the combustion chamber CH, pass a microwave with low transmission loss and possess heat resistance. For this reason, fused quartz may be employed as the material for the insulator 8. Further, the length of the dipole antenna 10 is set at 3 mm to permit the dipole antenna 10 to transmit and receive an electromagnetic wave excellently while making it difficult for the dipole antenna 10 to be damaged when the casing 1 is fitted into the engine block EB.

Figure 2:
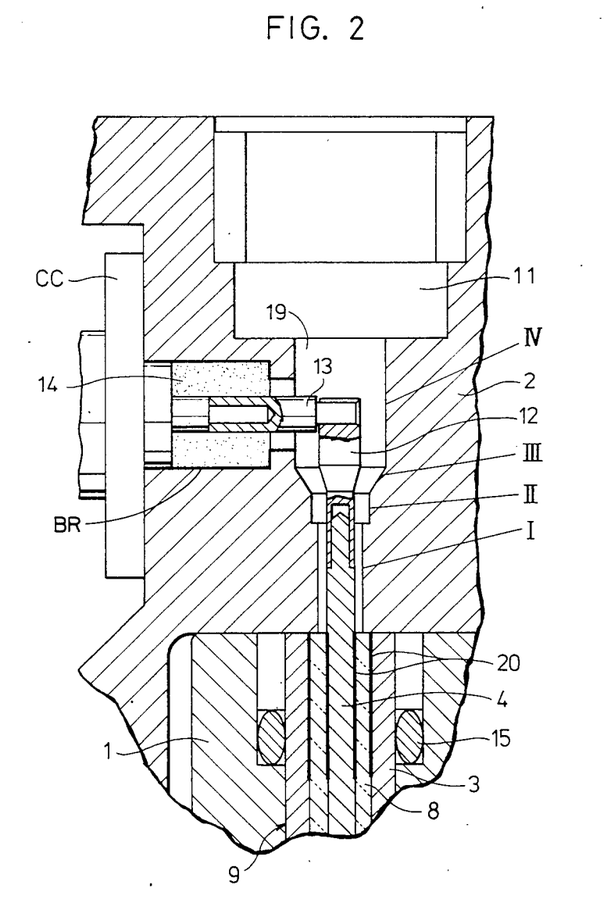
FIG. 2 is an enlarged sectional view of the upper portion of the microwave and luminous probe shown in FIG. 1.

FIG. 2 is an enlarged view of an essential portion of the holder 2, which also serves as an external conductor of the coaxial impedance transformer. The inner conductor 4 and a connecting portion 12 are connected together by a split-pin structure in a manner similar to an ordinary microwave connector, whereby it is possible for the inner conductor 4 to be easily connected to and disconnected from the connecting portion 12 as desired. When the inner conductor 4 is connected to the connecting portion 12, it is possible for the former to contact the latter in a low-resistance state by virtue of the spring action of the split-pin portion. Thus, the loss of the microwave transmission is minimized. The inner conductor 4 and the connecting portion 12 constitute in combination a coaxial line which is composed of a quarter-wave impedance transformer I having a length which is an integral multiple of $\frac{1}{4}$ of the wavelength of the microwave used, a 50-Ω coaxial portion II, a tapered portion III and a 50-Ω coaxial portion IV. Since the characteristic impedance of the coaxial portion 9 comprising inner and outer conductors 3 and 4 is about 24Ω, while the characteristic impedance of the microwave connector CC is 50Ω, it is necessary to effect an impedance change. For this reason, the characteristic impedance of the portion of the coaxial portion 9 downward of the 50-Ω coaxial portion II is changed to 50Ω by employing the quarter-wave impedance transformer I (whose characteristic impedance is about 35Ω). Further, the connecting portion 12 is soldered to a connecting portion 13 which has the same outer diameter as that of the internal conductor of the microwave connector CC. The maximum diameter of the connecting portion 12 is 1.6 mm. At the 50Ω coaxial portion designated as 11 in FIG. 2, the outer diameter of the internal conductor (4) is 1 mm and the inner diameter of the external conductor (II) is 2.3 mm. On the other hand, at the 50Ω coaxial portion designated as IV in FIG. 2, the outer diameter of the internal conductor 12 is 1.6 mm and the inner diameter of the external conductor (IV) is 3.6 mm.

Thus, a difference is present between the outer diameter of the internal conductor of the 50-Ω coaxial portion II and the outer diameter of the internal conductor of the 50-Ω coaxial portion IV. For this reason, the 50-Ω coaxial portion II and the 50-Ω coaxial portion IV are connected by employing the tapered portion designated as III so that the characteristic impedance is not changed. The tapered portion III is formed such that the tapering ratio between the outer diameter of the internal conductor and the inner diameter of the external conductor is approximately 1:2.3. Thus, the tapered portion III has a characteristic impedance of 50Ω.

A see-through hole 19 is provided above the tapered portion III for introducing the light emitted in the combustion chamber CH to the photodiode 11. The inner diameter of the see-through hole 19 is set at 3.6 mm. No inner conductor is present in the upper portion of the see-through hole 19, and the inner diameter of the see-through hole 19 is smaller than a diameter which is determined on the basis of the cut-off frequency. Since the see-through hole 19 can be regarded as a circular (cylindrical waveguide, the lowest mode of the cut-off wavelength is given by the following formula.

$\lambda c = 2\pi a/1.841$, where a is the radius of the waveguide. Also, cut-off frequency fc is given by the following formula.

$ic = c/\lambda c$, where C is the velocity of light. In this embodiment, since a is the radius of the see-through hole 19, namely, 1.8 mm, the cut-off wavelength c becomes 6.14 mm and the cut-off frequency fc becomes 49 GHz. On the other hand, the frequency applied in this embodiment is 18 GHz or less, which is sufficienty low, as compared with the cut-off frequency fc, so that the transmission of the microwave is cut off.

Therefore, due to the microwave ($f \leq 18$ GHz) resulting from setting the radius a of the see-through hole 19 (which constitutes the circular waveguide) in the above manner the see-through hole 19 does not result in the transmission of microwave. For this reason, the microwave of a particular frequency used is cut off. Accordingly, it is possible to ignore any leakage of the microwave from the 50-Ω coaxial portion IV. Thus, the provision of the see-through hole 19 has no adverse effect on the microwave transmission.

The connecting portion 13 has a hole having a diameter of 0.7 mm formed through its central axis and is coaxially secured by soldering to the center conductor (not shown) of the microwave connector CC through this hole. The connecting portion 13 is supported by a dielectric material 14 constituted by TEFLON polytetrafluoroethylene inserted within a bore BR formed at a right angle to the see-through hole 19 in the probe, which involves a favorably small microwave transmission loss. In the coaxial portion the conductive loss due to current flowing in the inner and outer conductors is larger than the dielectric loss due to the dielectric (TEFLON polytetrafluoroethylene in this embodiment). In TEFLON polytetrafluoroethylene the dielectric loss is very small, therefore the transmission loss is extremely small. As a result, a microwave signal is prevented from including any noise which might otherwise appear in the signal by the vibration of the connecting portion 13 when the engine vibrates.

Figure 3:
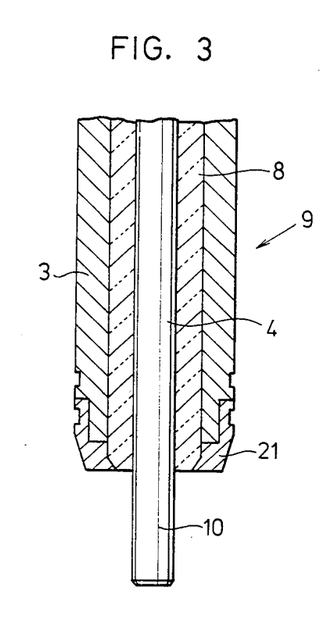
FIG. 3 is an enlarged sectional view of the lower portion of the microwave and luminous probe shown in FIG. 1.

FIG. 3 is an enlarged view of the lower end portion of the coaxial portion 9 which is inserted into the combustion chamber CH.

The outer peripheral portion at the lower end of the transparent insulator 8 on the side thereof which is closer to the combustion chamber CH is shaped so as to taper at $1/\sqrt{3}$ so that, if the transparent insulator 8 should be damaged or broken, a fragment of the insulator 8 is prevented from dropping into the combustion chamber CH which might damage an engine component, for example, an intake-exhaust valve. The inner peripheral portion of a cylindrical cap 21 which is fitted on the lower end portion of the coaxial portion 9 is also shaped such as to taper at $1/\sqrt{3}$ so that any fragment of the transparent insulator 8 is prevented from dropping into the combustion chamber CH even if the insulator 8 is broken. The lower end surface of the transparent insulator 8 is made substantially flush with the end surface of the cap 21 on the side thereof which is closer to the combustion chamber CH. The outer conductor 3 and the cap 21 are welded together. The outer periphery of the cap 21 on the side thereof which is closer to the combustion chamber CH is chamfered so that an O-ring 15 (see FIG. 2) is not damaged when the coaxial portion 9 is inserted into the casing 1.

The microwave and luminous probe P will now be described.

The sealing between the inner conductor 4 and the transparent insulator 8 is effected by a bonding portion 20 at the upper end of the coaxial portion 9 on the side thereof which is remote from the combustion chamber CH, as shown in FIG. 2. At the bonding portion 20, the outer diameter of the inner conductor 4 is set at 1 mm, while the inner diameter of the outer conductor 3 is set at 2.6 mm. Further, the thickness of the bonding layer between the transparent insulator 8 and the inner conductor 4 is set at 50 μm. Since the bonding portion 20 is not heated above 200° C., an epoxy adhesive, which is excellent in terms of the sealing and adhesive properties, may be employed as the material for the bonding portion 20. Since the sealing is effected at a portion which has a relatively low temperature as described above, it is possible to ensure sealing over the whole engine operating region and hence prevent the leakage of the combustion gas and carbon into the inside of the coaxial portion 9. It is to be noted that, since the portion of the coaxial portion 9 which includes the bonding portion 20 has a characteristic impedance slightly different from that of the other portion thereof, the overall length of the bonding portion 20 is made equal to one half of the wavelength of the microwave within the coaxial portion 9 which is determined by the frequency used (i.e., $\frac{1}{2} \cdot \lambda_0 / \sqrt{\epsilon \gamma}$, where, $\lambda^0$ is: the wavelength of the microwave in a vacuum and; $\epsilon \gamma$ is the dielectric constant of the insulator 8), thereby eliminating reflection which would be caused by impedance mismatching at the bonding portion 20.

Possible leakage of the combustion gas from a gap between the outer peripheral portion of the coaxial portion 9 and the casing 1 is prevented by means of the O-ring 15 and an O-ring 6 (see FIG. 1). On the other hand, possible leakage of the combustion gas from gap between the outer peripheral surface of the casing 1 and the inner peripheral surface of the engine block EB is prevented by means of tapered surfaces 22 which are respectively formed on the outer and inner peripheral surfaces of the casing 1 and the engine block EB.

The casing 1 and the coaxial portion 9 are secured to each other by employing two clamping screws 5 which are located symmetrically with each other with respect to the coaxial portion 9. Moreover, a ball plunger 7 which is provided in the holder 2 and a lock groove 24 formed in the upper portion of the casing 1 are adapted to engage with each other, whereby it is possible for the holder 2 to be easily mounted on and removed from the casing 1.

The microwave and luminous probe P is mounted on the engine block EB by screwing into the glow plug hole GH the casing 1 which is formed on its outer peripheral surface with an external thread S of the same dimension as that of a glow plug which is mounted on the engine block EB. It is possible for the microwave and luminous probe P to be easily mounted by applying a torque wrench on the hexagonal part formed at the upper part 23 of the casing 1 and screwing the casing 1 into the engine body in such a manner that the casing 1 is secured to the latter.

The following is a description of the operation of the above-described embodiment.

The light emitted in the combustion chamber CH passes through the insulator 8 and the see-through hole 19 and is received by the photodiode 11 where the light is converted into an electrical signal which is then transmitted through the shielded line (not shown) which is connected to the connector BC.

On the other hand, the microwave which is oscillated by a microwave oscillator (not shown) is transmittted to the microwave and luminous probe P through the coaxial cable (not shown) which is connected to the connector CC. The direction of the microwave is changed by 90° at the connecting portions 13 and 14. The microwave then passes through the coaxial portion 9 and is transmitted from the dipole antenna 10. The transmitted microwave is absorbed (when a resonance occurs) or reflected by the main combustion chamber (not shown). The microwave thus reflected is received by the dipole antenna 10, transmitted in the opposite direction relative to the above, passed through a transmit-receive separator (not shown) and then converted into an electrical signal by a microwave detector.

In the microwave and luminous probe P in accordance with this embodiment, the outer diameter of the distal end of the coaxial portion 9 can be reduced to 4 mm, so that it is possible for the microwave and luminous probe P to be mounted by making use of the glow plug hole of the diesel engine. Further, since the distal end portion of the coaxial portion 9 which projects into the combustion chamber CH is favorably small in terms of the size and the heat capacity, the existence of that distal end portion does not adversely affect the combustion condition in the combustion chamber CH.

Furthermore, since the entire microwave transmission line consists of the coaxial portions, it is possible for the microwave and luminous probe P to be reduced in the size and designed as a wide-band probe as well as mounted or removed by an easy and simple operation. Further, the probe P interferes very little with the other components of the engine, and the mounting position of the probe P is not restricted; therefore, it is possible to select an optimal frequency irrespective of the microwave and luminous probe P. Moreover, since the holder 2 is detachable, it is conveniently possible to mount or remove the microwave and luminous probe P in a state wherein the cable is fitted in the holder 2.

Figure 4:
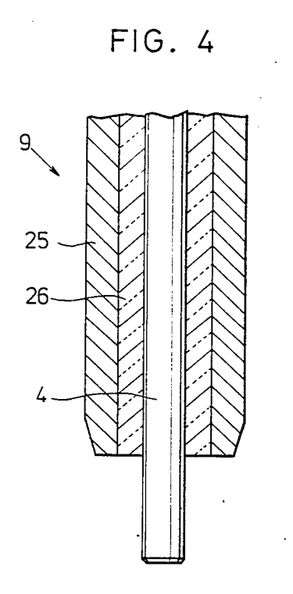
FIG. 4 is a sectional view corresponding to FIG. 3, which shows a second embodiment of the present invention.

A second embodiment of the invention will now be described with reference to FIG. 4 which shows the lower portion of the coaxial portion 9.

The second embodiment is a microwave and luminous probe which may be employed in a low-load engine. The second embodiment differs from the first embodiment only in terms of the structure of the distal end portion of the coaxial portion 9 on the side thereof which is closer to the combustion chamber CH. In the case of a low-load engine, the distal end portion of a transparent insulator 26 on the side thereof which is closer to the combustion chamber CH is not heated to a very high temperature, and consequently, the distal end portion of the insulator 26 is hardly damaged by heat. In the second embodiment, therefore, the outer diameter of the transparent insulator 26 and the inner diameter of an outer conductor 25 are set to have the same dimension, thus providing a structure which can be easily produced.

Figure 5:
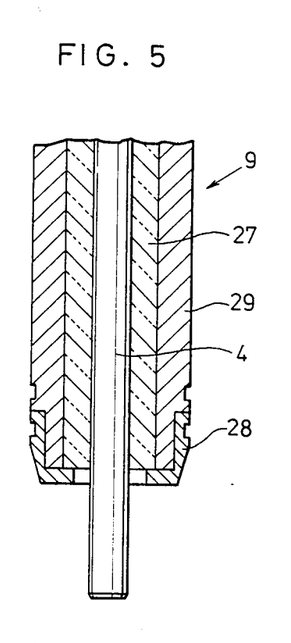
FIG. 5 is a sectional view corresponding to FIG. 3, which shows a third embodiment of the present invention.

The following is a description of a third embodiment of the invention with reference to FIG. 5 which shows the lower portion of the coaxial portion 9.

The third embodiment is a microwave and luminous probe which is employed only in a high-load engine. This embodiment differs from the first embodiment only in terms of the structure of the distal end portion of the coaxial portion 9 on the side thereof which is closer to the combustion chamber CH. In the case of a high-load engine, there is hardly a possibility of carbon adhering to the distal end portion of a transparent insulator 27 on the side thereof which is closer to the combustion chamber CH and thereby causing reduction in the intensity of the optical signal. For this reason, the lower end surface of a cap 28 having a U-shaped vertical cross-section is formed into a hook shape, and the inner diameter of the cap 28 is made smaller than the outer diameter of the insulator 27, thereby protecting the transparent insulator 27 from thermal and mechanical damages.

Although the invention has been described through specific terms, it is to be noted here that the described embodiments are not exclusive and various changes and modifications may be imparted thereto without departing from the scope of the invention which is limited solely by the appended claims.

What is claimed is:

1. A microwave and luminous probe for detecting the piston position and the light emitted by combustion in a combustion chamber of an internal combustion engine, said microwave and luminous probe comprising:
   (a) a probe body having an inner wall;
   (b) a coaxial portion having first and second ends, said first end thereof inserted into said combustion chamber, said coaxial portion including a tubular outer conductor, an inner conductor disposed coaxially with said outer conductor, and a transparent insulator interposed between said out and inner conductors;
   (c) dipole antenna means located at said first end of said coaxial portion;
   (d) a see-through hole having a predetermined diameter, dimensioned so as to cut off microwave transmission, formed on said inner wall of said probe body and disposed coaxially with said coaxial portion at said second end of said coaxial portion to lead the light emitted by combustion in said combustion chamber and received at said first end of said coaxial portion to a photosensor which detects said light;
   (e) a coaxial impedance transformer provided between said see-through hole and connected to said coaxial portion at the second end of said coaxial portion for obtaining matching in impedance;
   (f) a coaxial microwave connector fitted and inserted into a bore formed in said probe at a right angle to said see-through hole and in communication with a side wall of said see-through hole;
   (g) a bent coaxial portion provided within said see-through hole connected to both said coaxial microwave connector and to said impedance transformer;
   whereby the microwave propagated through said coaxial portion is transmitted from said dipole antenna means, while the microwave reflected from said combustion chamber is received by said dipole antenna means, and the light emitted by combustion in said combustion chamber is received by said transparent insulator.

2. A microwave and luminous probe according to claim 1, wherein said transparent insulator is made of fused quartz.

3. A microwave and luminous probe according to claim 1, wherein an epoxy adhesive is filled into an area between said inner conductor and said transparent insulator and an area between said outer conductor and said transparent insulator at said second end of said coaxial portion, whereby the areas between said transparent insulator and said inner and outer conductors are sealed.

4. A microwave and luminous probe according to claim 1, wherein the outer diameter of said inner conductor is made smaller than the inner diameter of said transparent insulator, and the outer diameter of said transparent insulator is made smaller than the inner diameter of said outer conductor, and an expoxy adhesive is filled between a portion of an outer wall of said inner conductor and a portion of an inner wall of said transparent insulator, and an epoxy adhesive is filled between a portion of an outer wall of said transparent insulator and a portion of an inner wall of said outer conductor and the axial length of these epoxy adhesive filled portions is one half of the wavelength of the microwave propagated therethrough.

5. A microwave and luminous probe according to claim 1, wherein the distal end of said transparent insulator at said first end of said coaxial portion is chamfered into a tapered shape and is covered with a cylindrical cap which has a shape corresponding to said tapered shape, whereby, if said transparent insulator should be damaged or broken, any fragment thereof is prevented from dropping into said combustion chamber.

6. A microwave and luminous probe according to claim 1, wherein said first end of said coaxial portion is covered with a cap which has a U-shaped vertical cross-section and is formed in its bottom surface with a bore having a diameter which is larger than the inner diameter of said transparent insulator but smaller than the outer diameter of the transparent insulator, whereby it is possible to protect said transparent insulator from any damage.

7. A microwave and luminous probe according to claim 1, wherein said dipole antenna means consists of a portion of said inner conductor of said coaxial portion which projects beyond said outer conductor by a length corresponding to $\frac{1}{8}$ to $\frac{3}{8}$ of the wavelength of the microwave used.

8. A microwave and luminous probe according to claim 1, wherein said coaxial impedance transformer has a length which is an integral multiple of $\frac{1}{4}$ of the wavelength of the microwave used.

9. A microwave and luminous probe according to claim 1, wherein said see-through hole constitutes a waveguide having a circular cross-section and wherein a tapered portion is provided between said see-through hole and said coaxial impedance transformer, said tapered portion being formed with a predetermined tapering ratio between the outer diameter of the internal conductor and the inner diameter of the external conductor.

10. A microwave and luminous probe according to claim 1, wherein said coaxial portion is received in a casing, while said photosensor, said see-through hole, said coaxial impedance transformer and said bent coaxial portion are supported by a holder, and said holder and said casing are detachably fitted to each other.

11. A microwave and luminous probe according to claim 10, wherein said holder serves as an external conductor of said coaxial impedance transformer.

12. A microwave and luminous probe adapted to detect both the piston position in a combustion chamber of an internal combustion engine by means of a microwave, and the light emitted by combustion in said combustion chamber by means of a photosensor, said microwave and luminous probe comprising:

(a) a probe body having an inner wall;
(b) a coaxial cable with a circular cross-section having first and second ends, the first end thereof received in said combustion chamber, said coaxial cable including; a tubular outer conductor which defines the external wall of said coaxial cable, an inner conductor having a circular cross-section coaxially disposed in the center of said coaxial cable, and a transparent insulator interposed between said outer and inner conductors;
(c) dipole antenna means consisting of a portion of said inner conductor at the first end of said coaxial cable which projects beyond said outer conductor at said first end;
(d) a see-through hole having a predetermined length and diameter, dimensioned so as to cut off microwave transmissions, formed on said inner wall of said probe body and disposed at the second end of said coaxial cable coaxially therewith to guide the light emitted by combustion from said first end of said coaxial cable through said transparent insulator to said photosensor;
(e) a coaxial impedance transformer coaxially connected to said coaxial cable, for obtaining matching in impedance;
(f) a coaxial microwave connector fitted into a bore formed in said probe, in communication with a side wall of said see-through hole;
(g) an L-shaped bent coaxial cable portion connected to said coaxial microwave connector and to said coaxial impedance transformer;
(h) a casing receiving said coaxial cable; and
(i) a holder detachably fitted on said casing, supporting; said photosensor, said coaxial impedance transformer, said coaxial microwave connector, and said bent coaxial cable portion, said holder defining an external conductor of said coaxial impedance transformer,
whereby the microwave is transmitted in a first direction from said dipole antenna means through said coaxial microwave connector, said bent coaxial cable portion, said coaxial impedance transformer and said coaxial cable, while the microwave reflected from said combustion chamber is propagated in a second direction, which is opposite to said first direction, and the light emitted by combustion in said combustion chamber is received by said photosensor through said transparent insulator and said see-through hole.

13. A microwave and luminous probe according to claim 12, wherein said transparent insulator is made of fused quartz.

14. A microwave and luminous probe according to claim 12, wherein an epoxy adhesive is filled into an area between said inner conductor and said transparent insulator and an area between said outer conductor and said transparent insulator at the second end of said coaxial cable, whereby the areas between said transparent insulator and said inner and outer conductors are sealed.

15. A microwave and luminous probe according to claim 12, wherein the outer diameter of said inner conductor is made smaller than the inner diameter of said transparent insulator, and the outer diameter of said transparent insulator is made smaller than the inner diameter of said outer conductor, and an epoxy adhesive is filled between a portion of an outer wall of said inner conductor and a portion of an inner wall of said transparent insulator, and an epoxy adhesive is also filled between a portion of an outer wall of said transparent insulator and a portion of an inner wall of said outer conductor, wherein the axial length of these epoxy adhesive filled portions is one half of the wavelength of the microwave propagated therethrough.

16. A microwave and luminous probe according to claim 12, wherein the distal end of said transparent insulator at said first end of said coaxial cable is chamfered into a tapered shape and is covered with a cylindrical cap which has a shape corresponding to said tapered shape, whereby, if said transparent insulator should be damaged or broken, any fragment thereof is prevented from dropping into said combustion chamber.

17. A microwave and luminous probe according to claim 12, wherein said first end of said coaxial cable is covered with a cap which has a U-shaped vertical cross-section, and is formed in its bottom surface with a bore having a diameter which is larger than the inner diameter of said transparent insulator but smaller than the outer diameter of the said transparent insulator, whereby it is possible to protect said transparent insulator from any damage.

18. A microwave and luminous probe according to claim 12, wherein said dipole antenna means consists of portion of said inner conductor of said coaxial cable which projects beyond said outer conductor by a length corresponding to $\frac{1}{8}$ to $\frac{3}{8}$ of the wavelength of the microwave used.

19. A microwave and luminous probe according to claim 12, wherein said coaxial impedance transformer has a length which is an integral multiple of $\frac{1}{4}$ of the wavelength of the microwave used.

20. A microwave and luminous probe according to claim 12, wherein said see-through hole constitutes a waveguide having a circular cross-section and wherein a tapered portion is provided between said see-through hole and said coaxial impedance transformer, said tapered portion being formed with a predetermined tapering ratio between the outer diameter of the internal conductor and the inner diameter of the external conductor.

* * * * *